Patented June 30, 1931

1,812,136

UNITED STATES PATENT OFFICE

FRANK J. CAHN, OF WHITING, INDIANA

CITRIC ACID MANUFACTURE

No Drawing.    Application filed February 16, 1929.    Serial No. 340,649.

The present invention relates to the production of organic acids by fungicidal action and may be applied to the manufacture of citric acid and other acids such as oxalic acid, malic acid, succinic acid, gluconic acid, fumaric acid, etc.

In carrying out the present invention the desired acid, such as citric, fumaric, malic, succinic, or the like, is produced by the fermentative action of selected strains of Aspergillus, Mucor, Penicillium, Rhizopus, Citromycetes or other fungi on fructose yielding carbohydrates, under which term I include fructose and those carbohydrates which on inversion or hydrolysis, form fructose, such as sucrose, inulin or the like. Similarly, certain of these and other acids, such as gluconic acid, may be produced by the action of selected strains of fungus (e. g. *Penicillium lutem*) on dextrose yielding carbohydrates, under which term I include dextrose and carbohydrates which yield dextrose on hydrolysis or inversion.

I have found that greatly increased yields of the desired acid, based on the carbohydrate subjected to fermentative action, may be secured by providing a base of organized plant tissue for the support of the carbohydrate and nutrient materials and for the action of the fungus. As pointed out in my prior application Serial No. 330,435, filed January 4, 1929, I may employ plant sections containing as normal constituents, the fructose-yielding carbohydrates. In accordance with my present invention, I may employ as a base, organized plant material or tissue having a cellulosic structure which does not contain the necessary carbohydrate constituents, such base material being saturated or impregnated with a suitable carbohydrate solution before being subjected to fermentation. The base material may suitably be dried plant material or plant material from which liquid or soluble constituents have been removed by pressing or by leaching.

The solid material is saturated or impregnated by immersing it in a suitable solution of a carbohydrate, for example, a solution containing 10 to 15% of sucrose, and subsequently drawing off excess liquid. While solutions of pure sucrose may be employed, I may also use molasses or other impure carbohydrate solutions. Thus, I may impregnate bagasse or dried, spent sugar beet cossettes with solutions made by diluting molasses to 10 to 15% sugar concentration, and ferment the resulting material with a selected strain of fungus, such as Aspergillus, to produce a desired acid, such as citric acid. The fermentation may be carried out in the same manner as with plant sections, as set forth in my prior application above referred to.

Thus, in carrying out the fermentation, the plant tissue material may be spread in layers or may be placed in tanks and in the case of softer plant tissues, it is preferred to dispose the plant tissue in layers within the tanks between open grids of wood, Monel metal or other resistant material, or between layers of inert packing material. Likewise, irregular masses of packing material, such as stoneware may be intermixed throughout the entire mass. Suitable disposition may be made for cooling or warming the entire mass undergoing fermentation, as pointed out in my prior application above referred to.

By carrying out the invention in the manner set forth, a greatly improved rate and efficiency of fermentation is secured. Thus, on preparing a nutrient liquid containing 15% sugar together with soluble extractives from sugar beets and fermenting it with a selected strain of *Aspergillus niger* at about 70° F. in the air in a layer one inch deep, at the end of two days, but 3% of the sugar was converted to citric acid. Using spent sugar beet cossettes, soaked in the same solution, with the same strain of fungus and under the same conditions, 49.3% of the sugar was converted to citric acid. Similarly, by soaking spent sugar beet cossettes or other plant tissue material in a solution containing 15% of pure sucrose, 0.25% ammonium nitrate, 0.1% acid potassium phosphate and 0.02% magnesium sulfate, fermenting it with a selected strain *Aspergillus niger* at about 70° F. in the air in a layer about one inch deep, 68.5% of the sugar was converted into citric acid in five days, whereas, under the same conditions with a layer of the same liquid an inch in depth only 1.7% of the sugar was converted into citric acid.

In order to facilitate the growth of the fungus, the plant tissue material may be subjected to a treatment which will cause a breaking down of cellular structure, either throughout the entire material or at least superficially thereof. This may be accomplished by steaming or cooking the plant tissue or by its alternate freezing and thawing, or the cellular structure may be broken down by the use of very high pressures. Ordinarily, it is preferred to steam or cook the plant tissue, as it is thereby sterilized in addition to having the cellular structure broken down.

If desired, the fermentative action of the fungus may be improved or controlled by providing on the surfaces of the particles of plant material, after impregnation with the carbohydrate solution, a suitable buffer material, generally of alkaline character, which does not affect the growth of the fungus, but reacts with and neutralizes with the acid formed. Thus, the fragments or particles of plant tissue material may be superficially powdered or covered with whiting (calcium carbonate), finely divided barium carbonate, zinc oxide, calcium phosphate or the like. In general it will be sufficient to employ such amounts of the insoluble buffer material as will normally adhere to the surfaces of the impregnated and drained fragments or particles. Soluble buffer materials may be employed, dissolved in the carbohydrate solution, but are more limited and less satisfactory in their action.

It is readily apparent that other plant tissue material may be employed, such as compressed meals resulting from the pressure extraction of oils from seeds and the like, corn cobs, or other cellulosic materials. After the removal of the acid produced by the fermentation, the spent plant tissue material has an enhanced nutritive value in the feeding of stock, by reason of the added protein supplied by the growth of the fungus. The carbohydrate solutions in which plant tissue material is impregnated or saturated may have added to it various nutrient materials, such as ammonium nitrate or other ammonium salts, asparagin or other readily assimilable nitrogen compounds and other nutrient materials adapted to improve the growth of the fungus. However, ordinarily sufficient nutrient materials are present in the plant tissue material and in the impurities associated with the carbohydrate when the lower grades of the latter are employed. The proportion of carbohydrate present in the solution may vary, from 10 to 15% being ordinarily suitable; but substantially higher or even lower proportions may be employed.

I claim:

1. The method of producing acids by fungicidal action which comprises impregnating plant tissue material with carbohydrates, inoculating said material with a selected acid-producing fungus strain and growing said fungus thereon to convert carbohydrates present to the desired acid.

2. The method of producing acids by fungicidal action which comprises impregnating plant tissue material with fructose-yielding carbohydrates, inoculating said material with a selected acid-producing fungus strain and growing said fungus thereon to convert carbohydrates present to the desired acid.

3. The method of producing acids by fungicidal action which comprises breaking down cellular tissue in plant tissue material, adsorbing carbohydrates therein, inoculating the plant tissue material with a selected acid-producing fungus strain and growing said fungus thereon to convert carbohydrates present to the desired acid.

4. The method of producing citric acid which comprises adsorbing fructose-yielding carbohydrates in plant tissue, inoculating the plant tissue with a selected citric acid-producing strain of fungus and growing the fungus thereon to convert carbohydrates present into citric acid.

5. The method of producing citric acid which comprises impregnating plant tissue material with a sucrose solution, inoculating the plant tissue material with a selected citric-producing fungus strain and growing said fungus thereon, thereby converting the carbohydrate into citric acid.

6. The method of producing organic acids which comprises impregnating plant tissue material with dextrose-yielding carbohydrates, inoculating the plant tissue material with a selected strain of acid-producing fungus and growing said fungus thereon, thereby converting the carbohydrate into the desired acid.

7. The method of producing acids by fungicidal action which comprises impregnating material of the class consisting of waste and spent cellulosic materials with carbohydrates, inoculating said material with a selected acid-producing fungus strain, and growing said fungus thereon to convert carbohydrates present to the desired acid.

8. The method of producing acids by fungicidal action which comprises impregnating spent sugar beet cossettes with a sucrose-containing solution, inoculating said material with a selected strain of acid-producing fungus, and growing said fungus thereon to convert carbohydrates present to the desired acid.

9. The method of producing acids by fungicidal action which comprises impregnating plant tissue material with a carbohydrate solution, applying to the surfaces thereof an insoluble buffer material, then inoculating said plant tissue material with a selected acid-producing strain of fungus and growing the fungus thereon to convert the carbohydrate to the desired acid.

10. The method of producing acids by fungicidal action which comprises impregnating spent sugar beet cossettes with carbohydrates, inoculating said material with a selected acid-producing fungus strain and growing said fungus thereon to convert carbohydrates present to the desired acid.

11. The method of producing acids by fungicidal action which comprises impregnating plant tissue material with a sucrose solution, inoculating said material with a selected acid-producing fungus strain, and growing said fungus thereon to convert the sucrose to the desired acid.

12. The method of producing citric acid which comprises adsorbing carbohydrates in in plant tissue material, inoculating the plant tissue with a selected citric acid-producing strain of fungus, and growing the fungus thereon to convert carbohydrates present into citric acid.

13. The method of producing citric acid which comprises adsorbing sucrose in spent sugar beet cossettes, inoculating said material with a selected citric acid-producing strain of fungus and growing the fungus thereon to convert the sucrose into citric acid.

14. The method of producing citric acid which comprises adsorbing fructose-yielding carbohydrates in spent sugar beet cossettes, inoculating said material with a selected citric acid-producing strain of fungus, and growing the fungus thereon to convert carbohydrates present into citric acid.

15. The method of producing gluconic acid which comprises impregnating plant tissue material with dextrose-yielding carbohydrates, inoculating the plant material with a selected gluconic acid-producing strain of fungus, and growing the fungus thereon to convert carbohydrates present into gluconic acid.

16. The method of producing gluconic acid which comprises adsorbing dextrose-yielding carbohydrates in spent sugar beet cossettes, inoculating said material with a selected gluconic acid-producing strain of fungus, and growing the fungus thereon to convert carbohydrates present into gluconic acid.

17. The method of producing acids by fungicidal action which comprises impregnating spent sugar beet cossettes with a carbohydrate solution, applying to the surfaces thereof, an insoluble buffer material, then inoculating said plant tissue material with a selected acid-producing strain of fungus, and growing the fungus thereon to convert the carbohydrates to the desired acid.

18. The method of producing citric acid by fungicidal action which comprises impregnating plant tissue material with a carbohydrate solution, applying to the surfaces thereof, an insoluble buffer material, then inoculating said material with a selected citric acid-producing strain of fungus and growing the fungus thereon to convert the carbohydrates to citric acid.

19. The method of producing citric acid by fungicidal action which comprises impregnating spent sugar beet cossettes with a carbohydrate solution, applying to the surfaces thereof, an insoluble buffer material, then inoculating said material with a selected citric acid-producing strain of fungus and growing the fungus thereon to convert the carbohydrates to citric acid.

20. The method of producing citric acid by fungicidal action which comprises impregnating spent sugar beet cossettes with a sucrose solution, applying to the surfaces thereof, an insoluble buffer material, then inoculating said material with a selected citric acid-producing strain of fungus and growing the fungus thereon to convert the sucrose to a citric acid.

In testimony whereof I, have hereunto set my hand and seal this 11th day of February, 1929.

FRANK J. CAHN.